(12) United States Patent
Kantorowicz et al.

(10) Patent No.: US 11,356,477 B2
(45) Date of Patent: Jun. 7, 2022

(54) VERIFYING INCOMING COMMUNICATIONS

(71) Applicant: Twilio Inc., San Francisco, CA (US)

(72) Inventors: Santiago Kantorowicz, Bogota (CO);
Lucas Martín Vidal, Bogota (CO);
Serge Kruppa, Medellin (CO)

(73) Assignee: Twilio Inc., Sao Francisco, CA (US)

( * ) Notice: Subject to any disclaimer, the term of this patent is extended or adjusted under 35 U.S.C. 154(b) by 0 days.

(21) Appl. No.: 16/790,175

(22) Filed: Feb. 13, 2020

(65) Prior Publication Data

US 2021/0044616 A1  Feb. 11, 2021

Related U.S. Application Data

(60) Provisional application No. 62/882,799, filed on Aug. 5, 2019.

(51) Int. Cl.
*H04M 1/66* (2006.01)
*H04M 1/68* (2006.01)
(Continued)

(52) U.S. Cl.
CPC .... *H04L 63/1466* (2013.01); *H04M 3/42042* (2013.01); *H04W 12/121* (2021.01);
(Continued)

(58) Field of Classification Search
CPC .. H04M 3/42263; H04M 3/436; H04M 1/006; H04M 1/724; H04M 1/72412; H04M 3/42365; H04M 2203/1091; H04M 2203/2011; H04M 2207/206; H04M 3/42093; H04M 7/0075; H04M 3/00; H04M 15/08; H04M 15/28; H04M 1/72406; H04M 1/72513; H04M 2201/38; H04M 2201/60;
(Continued)

(56) References Cited

U.S. PATENT DOCUMENTS 10,412,206 B1 * 9/2019 Liang ................ H04M 3/42204
2014/0256294 A1 * 9/2014 Chatterjee ............... H04W 4/12
455/412.2

(Continued)

*Primary Examiner* — Joseph Arevalo
(74) *Attorney, Agent, or Firm* — Schwegman Lundberg & Woessner, P.A.

(57) ABSTRACT

Disclosed are systems, methods, and non-transitory computer-readable media for verifying an incoming communication. A recipient client device receives an incoming communication including an identifier identifying a second client device as having initiated the incoming communication. A verification service installed on the recipient client device queries a call placement service directory based on the first identifier. The call placement service directory maintains a listing of identifiers for client devices and corresponding communication providers that manage the identifiers. The call placement service directory returns information identifying the communication provider that manages the identifier. In turn, the verification service transmitting a request to the communication provider to confirm whether the second client device initiated the incoming communication. The verification service processes the incoming communication based on the response from the communication provider indicating whether the second client device initiated the incoming communication.

14 Claims, 8 Drawing Sheets

(51) Int. Cl.
  *H04L 9/40* (2022.01)
  *H04M 3/42* (2006.01)
  *H04W 12/48* (2021.01)
  *H04W 12/121* (2021.01)
  *H04L 67/141* (2022.01)
  *H04L 67/10* (2022.01)
  *H04L 67/306* (2022.01)

(52) U.S. Cl.
  CPC ............ *H04W 12/48* (2021.01); *H04L 67/10* (2013.01); *H04L 67/141* (2013.01); *H04L 67/306* (2013.01)

(58) Field of Classification Search
  CPC . H04M 2203/2016; H04M 2203/2044; H04M 2203/253; H04M 2203/4536; H04M 2203/554; H04M 2203/6081; H04M 2203/651; H04M 3/38; H04M 3/4211; H04M 3/42153; H04M 3/428; H04M 3/4878; H04M 3/493; H04M 3/527; H04M 3/533; H04M 3/53333; H04M 3/54; H04M 2203/551; H04M 3/42042; H04M 3/42314; H04M 3/42382; H04M 7/0006; H04M 7/0033; H04M 7/0042; H04M 7/009; H04M 7/128; H04W 12/06; H04W 12/069; H04W 4/02; H04W 4/029; H04W 4/12; H04W 4/16; H04W 4/24; H04W 4/50; H04W 76/00; H04W 76/10; H04W 12/121; H04W 12/48
  USPC ............ 455/410, 414.1, 407, 566, 411, 461, 455/412.2, 415, 556.1, 405
  See application file for complete search history.

(56) References Cited

U.S. PATENT DOCUMENTS

| | | | |
|---|---|---|---|
| 2014/0335822 A1* | 11/2014 | Jain ........................ | H04W 4/50 455/407 |
| 2015/0350332 A1* | 12/2015 | Rauenbuehler ....... | H04M 1/006 709/228 |
| 2015/0350418 A1* | 12/2015 | Rauenbuehler ... | H04M 1/72513 455/414.1 |
| 2019/0199847 A1* | 6/2019 | Nguyen ............ | H04M 1/72433 |
| 2020/0051024 A1* | 2/2020 | Oberle ................... | H04L 51/28 |

* cited by examiner

VERIFYING INCOMING COMMUNICATIONS

CROSS-REFERENCE TO RELATED APPLICATIONS

The present application claims the benefit of priority of U.S. Provisional Application No. 62/882,799, filed on Aug. 5, 2019, which is incorporated herein by reference in its entirety.

TECHNICAL FIELD

An embodiment of the present subject matter relates generally to communication services and, more specifically, to verifying incoming communications.

BACKGROUND

Caller Identifier (ID) spoofing is a technique that allows for altering the information forwarded to a caller ID in order to hide the true origin ID (e.g., phone number). Though spoofing may be used for legitimate purposes, it is also one of the many ways scammers steal personal identity and money over the phone. One common technique is referred to as neighbor spoofing, in which a scammer will spoof a number of a trusted entity or person that is local or familiar to their target. For example, scammers may spoof numbers that are similar (e.g., same area code, same first three number, etc.) to the target user's phone number. Unsuspecting users are tricked into believing the call is coming from a legitimate phone number because it appears to be coming from a phone number in their local area code. As a result, users are more likely to answer the call and become a victim of a phone scam. Accordingly, improvements are needed.

SUMMARY

A cloud-based communication platform provides communication services for multiple accounts of the cloud-based communication platform. Each account may be associated with a different customer of the cloud-based communication platform (e.g., individual user, set of users, company, organization, online service, etc.). The communication services provided by the cloud-based communication platform may include a variety of cloud-based communication services, such as facilitating communication sessions between endpoints (e.g., client devices), managing incoming communication requests, routing communication requests to an appropriate endpoint, logging data associated with communication sessions, etc.

A communication session is any type of communication between two or more client devices (e.g., smart phones, laptops, computers, etc.), such as text communication, voice communication (e.g., phone call), video communication (e.g., video conference), etc. The cloud-based communication platform facilitates communication sessions between two or more client devices by receiving communications (e.g., voice, audio, media, etc.) from the client devices that are transmitted as part of the communication session and forwarding the communications to the other client devices participating in the communication session. For example, to facilitate a communication session such as a Voice Over Internet Protocol (VoIP) call, the cloud-based communication platform receives audio data from each client device (e.g., phone) participating in the communication session and forwards the received audio data to the other client devices that are participating in the communication session. As another example, to facilitate a communication session such as an instant messaging chat, the cloud-based communication platform receives messages from each client device (e.g., phone, computer, etc.) participating in the communication session and forwards the received messages to the other client devices that are participating in the communication session.

The communication services provided by the cloud-based communication platform may be incorporated into a customer's application or website such that users of the customer's application or website may utilize the communication services facilitated by the cloud-based communication platform through use of the customer's application or website. For example, a customer that provides a ride sharing application may incorporate the communication services facilitated by the cloud-based communication platform into their application to enable users of the application to establish a communication session (e.g., phone call, chat session, etc.) with their assigned driver. As another example, a customer that provides a dating application may incorporate the communication services facilitated by the cloud-based communication platform to enable users of the dating application to establish communication session with other users.

Users of the application may not have knowledge that the communication services they are using through the application are being facilitated by the cloud-based communication platform. That is, the communication services may be presented as being a part of the application itself rather than provided by the cloud-based communication platform. In this way, the communication services facilitated by the cloud-based communication platform are provided as SaaS.

The cloud-based communication platform provides a verification service that verifies the authenticity of inbound communications (e.g., incoming calls, messages, etc.). That is, the verification service confirms that the device identifier (e.g., phone number) received along with an inbound communication correctly identifies the client device that transmitted the inbound communication (e.g., the phone number is not spoofed). The verification service may deny inbound communications that cannot be verified (e.g., the inbound communication is using a spoofed identifier or there is insufficient data to verify the inbound communication). Alternatively, the verification service may present a notification on the recipient client device indicating that the incoming communication is not verified. If the verification service successfully verifies the inbound communication (e.g., the device identifier is determined to correctly identify the client device that transmitted the inbound communication), the verification service may present a notification on the recipient client device indicating that the inbound communication has been verified.

To verify the authenticity of an inbound communication, the verification service utilizes a call placement service directory (e.g., Domain Name System (DNS)) that stores a listing of device identifiers (e.g., phone numbers) and associated communication information. The communication information associated with each listed device identifier includes data identifying the communication provider (e.g., the cloud-based communication platform, third-party communication platform, etc.) managing the device identifier. In response to receiving an inbound communication, the verification software installed on the recipient client device (e.g., the client device receiving the inbound communication) causes the recipient client device to query the call placement service directory for the communication information associated with the device identifier received along with the incoming communication.

The verification software uses the received communication information to then cause the recipient client device to query the identified communication provider to confirm whether the client device associated with the device identifier transmitted the incoming communication. For example, in embodiments in which the incoming communication is a phone call, the communication provider confirms whether the client device associated with the device identifier is engaged in an active communication session. The client device being engaged in an active communication session suggests that the incoming communication did originate from the client device associated with the device identifier.

Alternatively, if the incoming communication is a message, the communication provider confirms whether the client device associated with the device identifier transmitted a message to the recipient client device. For example, the communication provider confirms whether a message including the payload of the incoming communication was sent and/or that a message was sent at a time corresponding to the timestamp of the incoming communication. To reduce resources associated with this, the verification service may utilize a hashing algorithm. For example, the verification software installed on the recipient client device may use the identifier received with the incoming communication, the identifier for the recipient device, timestamp, and/or any portion of the payload as input into the hashing algorithm. The verification software provides the resulting output of the hashing algorithm to the communication provider. In turn, the communication provider uses the same input maintained by the communication provider into the same hashing algorithm and compares the output to the output received from the verification service. Matching outputs indicate that the client device associated with the device identifier transmitted the message to the recipient client device.

If the communication provider provides a response confirming that the client device associated with the device identifier transmitted the incoming communication, the verification service verifies the incoming communication. Alternatively, if the communication provider does not provide a response confirming that the client device associated with the device transmitted the incoming communication (e.g., the communication provided responds that the client device is not engaged in an active communication session or does not provide a response), the verification service determines that the incoming communication is not verified.

In addition to verifying the authenticity of an incoming communication, the verification service also allows for presentation of customized content on the recipient device along with the incoming communication. For example, the verification service allows a company or other entity to cause their logo, a message, an advertisement, etc., to be presented on a recipient device when the company or entity initiates a communication with the client device (e.g., a representative of the company calls the recipient client device, transmits a message, etc.). To accomplish this, an entity (e.g. company) associated with a device identifier stored in the call placement service directory may include content (e.g., image, video, message etc.) and/or link to the content, which may be stored at the call placement service directory 108 (e.g. included in the communication information associated with the device identifier) and/or at the communication provider. The content and/or link is returned to a recipient client device as part of the verification process, such as along when the recipient client device queries the call placement service directory and/or the communication provider.

The verification service uses the received content and/or link to present the desired content on the display of the recipient client device. For example, the verification service accesses the content through the provided link and presents the content on the display of the recipient client device. In some embodiments, the verification service causes presentation of the customized content when the incoming communication is verified (e.g., the customized content is not presented when the incoming communication is not verified).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Figure 1:
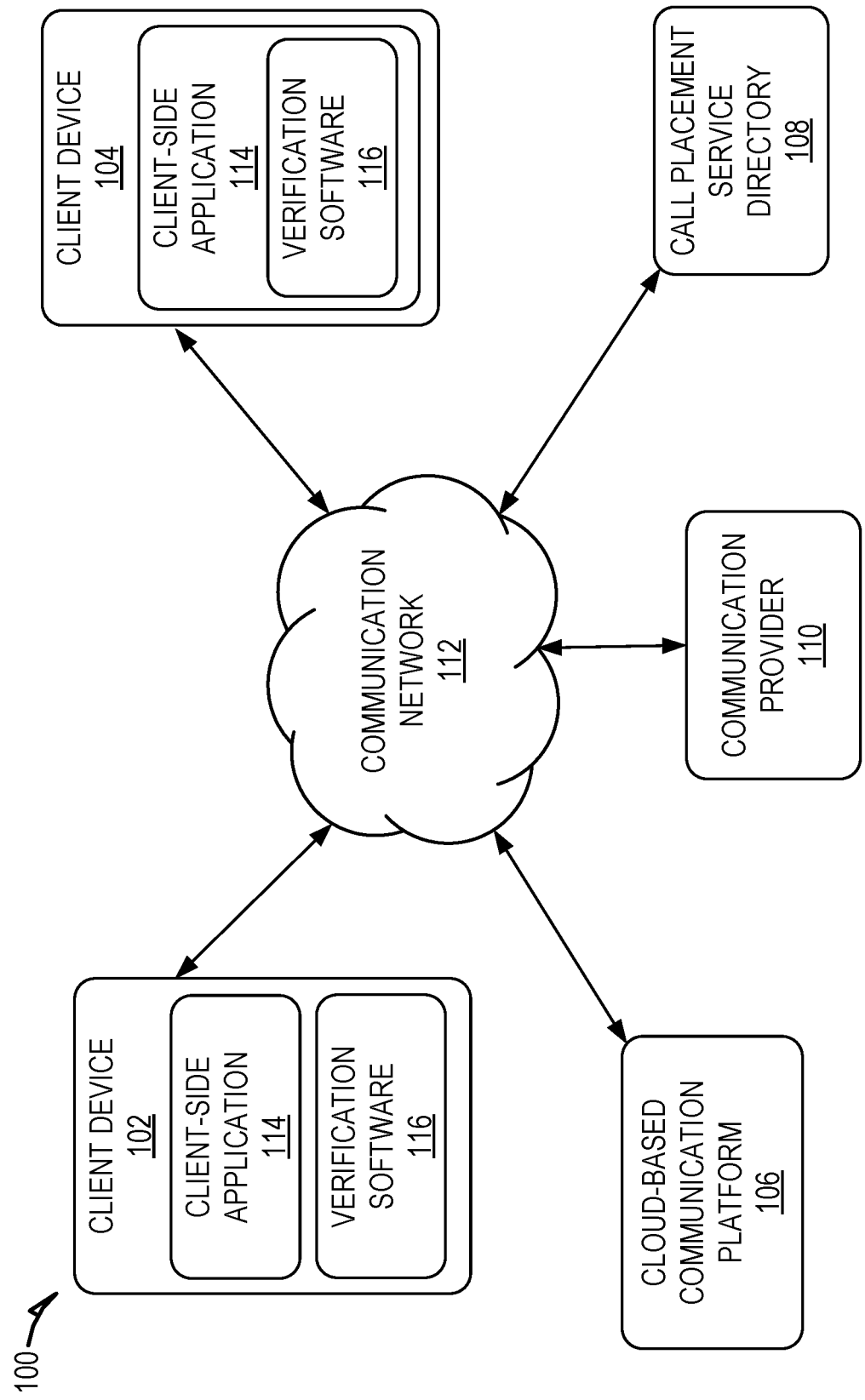
FIG. 1 shows an example system for verifying incoming communications, according to some example embodiments.

Disclosed are systems, methods, and non-transitory computer-readable media for verifying incoming communications. FIG. 1 shows an example system 100 for verifying incoming communications, according to some example embodiments. As shown, multiple devices (i.e., client device 102, client device 104, cloud-based communication platform 106, call placement service directory 108, and communication provider 110) are connected to a communication network 112 and configured to communicate with each other through use of the communication network 112. The communication network 112 is any type of network, including a local area network (LAN), such as an intranet, a wide area network (WAN), such as the internet, or any combination thereof. Further, the communication network 112 may be a public network, a private network, or a combination thereof. The communication network 112 is implemented using any number of communication links associated with one or more service providers, including one or more wired communication links, one or more wireless communication links, or any combination thereof. Additionally, the communication network 112 is configured to support the transmission of data formatted using any number of protocols.

Multiple computing devices can be connected to the communication network 112. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the cloud-based communication platform 106 to utilize the communication services provided by the cloud-based communication platform 106. For example, users communicate with and utilize the functionality of the cloud-based communication platform 106 by using the client devices 102 and 104 that are connected to the communication network 112 by direct and/or indirect communication. Although the shown system 100 includes only two client devices 102, 104, this is only for ease of explanation and is not meant to be limiting. One skilled in the art would appreciate that the system 100 can include any number of client devices 102, 104.

Further, the cloud-based communication platform 106 may concurrently accept connections from and interact with any number of client devices 102, 104. The cloud-based communication platform 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user may interact with the cloud-based communication platform 106 via a client-side application 114 installed on the client devices 102 and 104. In some embodiments, the client-side application 114 includes a component specific to the cloud-based communication platform 106. For example, the component may be a stand-alone application, one or more application plug-ins, and/or a browser extension. However, the users may also interact with the cloud-based communication platform 106 via a client-side application 114, such as a web browser, that resides on the client devices 102 and 104 and is configured to communicate with the cloud-based communication platform 106. In either case, the client-side application 114 may present a user interface (UI) for the user to interact with the cloud-based communication platform 106. For example, the user interacts with the cloud-based communication platform 106 via a client-side application 114 integrated with the file system or via a webpage displayed using a web browser application. Alternatively, the client-side application 114 may utilize an Application Programming Interface (API) of the cloud-based communication platform 106 to communication with the cloud-based communication platform 106 and provide functionality of the cloud-based communication platform 106 within the client-side application 114.

The cloud-based communication platform 106 provides communication services for multiple accounts of the cloud-based communication platform 106. Each account may be associated with a different customer of the cloud-based communication platform 106 (e.g., individual user, set of users, company, organization, online service, etc.). The communication services provided by the cloud-based communication platform 106 may include a variety of cloud-based communication services, such as facilitating communication sessions between endpoints (e.g., client devices 102, 104), managing incoming communication requests, routing communication requests to an appropriate endpoint, logging data associated with communication sessions, etc.

A communication session is any type of communication between two or more client devices 106, 104 (e.g., smart phones, laptops, computers, etc.), such as text communication, voice communication (e.g., phone call), video communication (e.g., video conference), etc. The cloud-based communication platform 106 facilitates communication sessions between two or more client devices 102, 104 by, for example, receiving communications (e.g., voice, audio, media, etc.) from the client devices 102, 104 that are transmitted as part of the communication session and forwarding the communications to the other client devices 102, 104 participating in the communication session. For example, to facilitate a communication session such as a Voice Over Internet Protocol (VoIP) call, the cloud-based communication platform 106 receives audio data from each client device 102, 104 (e.g., phone) participating in the communication session and forwards the received audio data to the other client devices 102, 104 that are participating in the communication session. As another example, to facilitate a communication session such as an instant messaging chat, the cloud-based communication platform 106 receives messages from each client device 102, 104 (e.g., phone, computer, etc.) participating in the communication session and forwards the received messages to the other client devices 102, 104 that are participating in the communication session.

To utilize the communication services provided by the cloud-based communication platform 106, a customer creates an account with the cloud-based communication platform 106. The cloud-based communication platform 106 may allocate device identifiers (e.g., phone numbers) to the customer's account and manage communications for the allocated device identifiers. That is, incoming communications (e.g., phone calls) directed to the device identifier are routed to the cloud-based communication platform 106. In turn, the cloud-based communication platform 106 establishes and facilitates a communication session between the source client device 102 that initiated the communication and the recipient client device 104 associated with the device identifier. This may include a client device 104 uniquely designated to the device identifier, or a set of client devices 104 designated to the device identifier.

The cloud-based communication platform 106 provides an API that allows customers to integrate the communication services provided by the cloud-based communication platform 106 into their client-side applications 114 and/or websites. For example, a customer uses the API provide by the cloud-based communication platform 106 to develop their client-side application 114 and/or website of the customer. Inclusion of the API causes the client-side application 114 and/or website to communicate with the cloud-based communication platform 106 to provide communication services provided by the cloud-based communication platform 106 through the client-side application 114 and/or website of the customer.

As an example, a customer that provides a ride sharing client-side application 114 may utilize the communication services provided by the cloud-based communication platform 106 to enable users and drivers of the ride sharing client-side application 114 to communicate with each other. As another example, a customer that provides a dating client-side application 114 may utilize the communication services provided by the cloud-based communication platform 106 to enable users and drivers of the dating client-side application 114 to communicate with each other.

Users of the client-side application 114 may not have knowledge that the communication services they are using through the client-side application 114 are being facilitated by the cloud-based communication platform 106. That is, the communication services may be presented as being a part of the customer's client-side application 114 itself rather than provided by the cloud-based communication platform 106. In this way, the communication services facilitated by the cloud-based communication platform 106 are provided as SaaS.

The cloud-based communication platform 106 provides a verification service that verifies the authenticity of inbound communications (e.g., incoming calls, messages, etc.) received at a recipient client device 102. That is, the verification service confirms that the device identifier (e.g., phone number) received by a recipient client device 102 along with an inbound communication correctly identifies the client device 104 that transmitted the inbound communication (e.g., the phone number is not spoofed). The verification service may deny inbound communications that cannot be verified (e.g., the inbound communication is using a spoofed identifier or there is insufficient data to verify the inbound communication). Alternatively, the verification service may present a notification on the recipient client device 102 indicating that the incoming communication is not verified. In situation in which the verification service successfully verifies the inbound communication (e.g., the device identifier is determined to correctly identify the client device 104 that transmitted the inbound communication), the verification service may present a notification on the recipient client device 102 indicating that the inbound communication has been verified.

To utilize the verification service provided by the cloud-based communication platform 106, verification service software 116 (e.g., verification software) provided by the cloud-based communication platform 106 is installed on a recipient client device 102. For example, a customer includes the verification software 116 provided by the cloud-based communication platform 106 into their client-side application 114 or website, as shown in relation to client device 104. Alternatively, the verification software 116 may be installed separately from a client-side application 114, as shown in relation to client device 102. The verification software 116, when installed on a recipient client device 102 (e.g., as part of the customer client-side application 114) causes the recipient client device 102 executing the client-side application 114 or website to perform a verification process when an incoming communication is received by the recipient client device 102. For example, the verification software 116 may cause the recipient client device 102 such as a smart phone, to perform a verification process when the recipient client device 102 receives an incoming phone call and/or an incoming message.

To verify the authenticity of an inbound communication, the verification service utilizes a call placement service directory 108 that stores a listing of device identifiers (e.g., phone numbers) and associated communication information. The communication information associated with each listed device identifier includes data identifying the communication provider 110 (e.g., the cloud-based communication platform, third-party communication platform, etc.) that manages the corresponding device identifier. The call placement service directory 108 may be any type of computing server or system that is capable of maintaining a list of device identifiers and associated communication information, receiving requests including device identifiers, and returning the communication information corresponding to the received devices identifiers. For example, in some embodiments, the call placement service directory 108 may be implemented using a DNS server.

In response to receiving an inbound communication, the verification software 116 installed on the recipient client device 102 causes the recipient client device 102 to query the call placement service directory 108 for the communication information associated with the device identifier received along with the incoming communication. For example, the recipient client device 102 transmits the device identifier to the call placement service directory 108 as part of the query for the corresponding communication information. In response to receiving the query, the call placement service directory 108 uses the received device identifier to identify the corresponding communication information, which the call placement service directory 108 returns to the recipient client device 102 from which the query was received.

The communication information includes data identifying the communication provider 110 that manages the device identifier. For example, the data identifying the communication provider may include a link or other identifier (e.g., Uniform Resource Identifier (URI)) that identifies the communication provider 110.

A communication provider 110 is a system that provides communication services for client devices 102, 104. For example, a communication provider 110 may be a telecommunications service provider that facilitates communications such as voice, messaging, video, etc. Examples of a communication provider 110 include the cloud-based communication platform 106, which facilitates communications among endpoints, or other third-party communication providers 110. Although only one communication provider 110 is shown, the system 100 may include any number of communication providers 110.

In some embodiments, querying the call placement service directory 108 may be restricted to client devices 102, 104 that have been authenticated by the verification service. For example, the verification service may utilize a public/private key pair to restrict querying of the call placement service directory 108. In this type of embodiment, a client device 102, 104 provides a public key during an authentication process. The public key pairs to a private key maintained by the client device 102, 104. The public key is stored at the call placement service directory 108 and used to ensure that a query is received by an authorized client device 102, 104. For example, the verification software 116 installed on an authorized client device 102 digitally signs queries transmitted to the call placement service directory 108 using the private key, and the call placement service directory 108 uses the corresponding public key to determine whether to authorize the request.

After successfully querying the call placement service directory 108, the verification software 116 uses the received communication information to cause the recipient client device 102 to query the identified communication provider 110 regarding whether the client device 104 associated with the device identifier transmitted the incoming communication. For example, the verification software 116 may use the link or URI included in the communication information to communicate with the communication provider.

In embodiments in which the incoming communication received by the recipient client device 102 is a phone call, the communication provider 110 confirms whether the client device 104 associated with the device identifier is engaged in an active communication session. The client device 104 associated with the device identifier being engaged in an active communication session suggests that the incoming communication did originate from the client device 104 associated with the device identifier. Conversely, the client device 104 associated with the device identifier not being engaged in an active communication session suggests that the incoming communication did not originate from the client device 104 associated with the device identifier.

As another example, if the incoming communication received by the recipient client device 102 is a message (e.g., text message, direct message, etc.), the communication provider 110 confirms whether the client device 104 associated with the device identifier transmitted the message to the recipient client device 102. For example, the communication provider confirms 110 whether a message including the payload of the incoming communication was sent by the client device 104 associated with the device identifier and/or that the client device 104 associated with the device identifier sent a message at a time corresponding to the timestamp of the incoming communication.

In some embodiments, the verification service may utilize a hashing algorithm to reduce resources associated with the process of verifying incoming messages. For example, the verification software 116 installed on the client device 116 may use one or more of the identifier received with the incoming communication, the identifier for the recipient device 102, a timestamp associated with the incoming message, and/or any portion of the message payload as input into the hashing algorithm. The verification software 116 provides the resulting output of the hashing algorithm to the communication provider 110 along with the query transmitted to the communication provider 110. In turn, the communication provider 110 uses similar data maintained by the communication provider 110 as input into the same hashing algorithm and compares the output to the output generated by the verification software 116 installed on the recipient client device 102. For example, the communication provider 110 may use the identifier received with the incoming communication, the identifier for the most recent recipient device 102 to which the client device 104 identified by the identifier transmitted a message, a timestamp associated with the sent message, and/or any portion of the message payload as input into the hashing algorithm. Matching outputs indicate that the client device 104 associated with the device identifier transmitted the message to the recipient client device 102. Alternatively, outputs that do not match indicate that the client device 104 associated with the device identifier did not transmit the message to the recipient client device 102.

If the communication provider 110 provides a response confirming that the client device 104 associated with the device identifier transmitted the incoming communication to the recipient device 102, the verification software 116 executing on the recipient client device 102 verifies the incoming communication. For example, the verification software 116 may cause the incoming communication to be presented on a display of the recipient client device 102. This may include causing presentation of an alert that an incoming call is being received and allowing for the incoming call to be accepted. As another example, causing presentation of the incoming communication may include presenting the incoming message on the display of the recipient client device 102. In some embodiments, the verification software 116 may also cause presentation of a visual indicator that the incoming communication (e.g., call, message) has been verified. For example, the visual indicator may be an icon, image or message indicating that the incoming communication is verified.

Alternatively, if the communication provider 110 does not provide a response confirming that the client device 104 associated with the device identifier transmitted the incoming communication (e.g., the communication provider 110 responds that the client device 104 is not engaged in an active communication session or does not provide a response), the verification software 116 executing on the recipient client device 102 concludes that the incoming communication cannot be verified. In this type of situation, the verification software 116 may block the incoming communication. For example, a blocked incoming call may not be presented on the display of the recipient client device 102 and therefore cannot be accepted. As another example, a blocked message may not be presented on the display of the recipient client device 102.

In some embodiments, the verification software 116 may present an incoming communication that cannot be verified on the display of the recipient client device 102, rather than blocking the incoming communication. In this type of embodiment, however, the verification software 116 will not cause presentation of a visual indicator indicating that the incoming communication has been verified. Rather, the verification software 116 may cause presentation of a visual indicator indicating that the incoming communication could not be verified or is not verified.

In addition to verifying the authenticity of an incoming communication, the verification service also allows for presentation of customized content on the recipient client device 102 along with an incoming communication. For example, the verification service allows a company or other entity to cause customized content, such as an image (e.g., logo, advertisement, picture, etc.) and/or a message, to be presented on a display of the recipient client device 102, when the company or entity initiates a communication with the recipient client device 102, 104 (e.g., a representative of the company calls or messages the recipient client device 102). This provides multiple benefits to the receiving user as well as the initiating entity. For example, the presented content (e.g., image and/or message) allows the transmitting entity to explain the purpose of the incoming communication, which may increase the likelihood that the recipient will engage in a communication session (e.g., answer the call, read the message, or respond to the message). As another example, the presented content may notify the recipient user that the identity of the incoming communication has been verified.

To cause presentation of customized content along with an incoming communication, the verification software 116 installed on a recipient client device 102 retrieves the content (e.g., image, message, etc.) and/or a link to access the content during the verification process of an incoming communication. The content and/or link is initially provided by the entity (e.g. company) to the verification service, for example, during a verification process or when an incoming communication is initiated by the entity. The content and/or link may be stored by the call placement service directory 108 and/or the communication provider 110 and associated with the entity. For example, the content and/or link may be associated with one or more device identifiers allocated with the entity.

During the verification process, the content and/or link may be returned to the recipient client device 102 when the either the call placement service directory 108 and/or the communication provider 110 are queried by the recipient client device 102. The verification software 116 executing on the recipient client device 102 uses the received content and/or link to present the desired message or content on the display of the recipient client device 102. For example, the verification software 116 accesses the content through the provided link and presents the content on the display of the recipient client device 102. In some embodiments, the verification software 116 causes presentation of the customized content if/when the incoming communication is verified. In other words, the verification software does not cause presentation of the customized content when the incoming communication is not verified.

Figure 2:
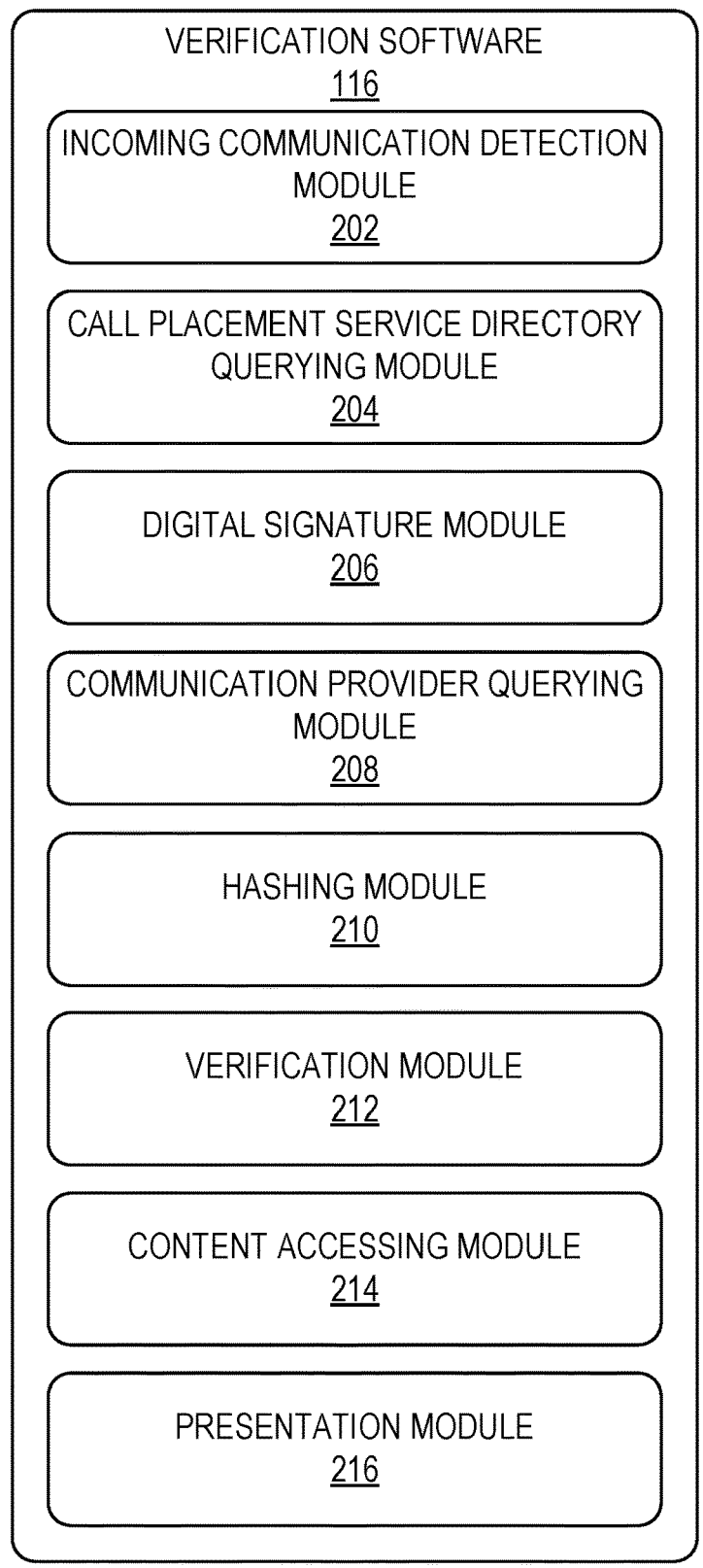
FIG. 2 is a block diagram of verification software for verifying incoming communications to a recipient client device, according to some example embodiments.

FIG. 2 is a block diagram of verification software 116 for verifying incoming communications to a recipient client device 102, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the verification software 116 to facilitate additional functionality that is not specifically described herein. Furthermore, the various functional modules depicted in FIG. 2 may reside on a single computing device or may be distributed across several computing devices in various arrangements such as those used in cloud-based architectures. For example, some functionality of the verification software 116 may be performed at the recipient client device 102, the cloud-based communication platform 106, the communication provider 110, and/or the call placement service directory 108.

As shown, the verification software 116 includes an incoming communication detection module 202, a call placement service directory querying module 204, a digital signature module 206, a communication provider querying module 208, a hashing module 2108, a verification module 212, a content accessing module 214, and a presentation module 216.

The incoming communication detection module 202 detects incoming communications to the recipient client device 102. An incoming communication may be an incoming call, message, video call, etc. The incoming communication may include a device identifier that identifies the client device 104 that transmitted the incoming communication.

In response to detecting an incoming communication, the incoming communication detection module 202 initiates a verification process to verify the device identifier received with the incoming communication. For example, the verification process verifies that the client device 104 identified by the device identifier transmitted the incoming communication (e.g., the device identifier was not spoofed). To initiate the verification process, the incoming communication detection module 202 provides the device identifier to the call placement service directory querying module 204.

The call placement service directory querying module 204 uses the device identifier to query a call placement service directory. The call placement service directory 108 stores a listing of device identifiers (e.g., phone numbers) and associated communication information. The communication information associated with each listed device identifier includes data identifying the communication provider 110 (e.g., the cloud-based communication platform, third-party communication platform, etc.) that manages the corresponding device identifier.

The query transmitted by the call placement service directory querying module 204 requests that the call placement service directory 108 return the communication information associated with the device identifier received along with an incoming communication. For example, the call placement service directory querying module 204 may include the device identifier in the query transmitted to the call placement service directory 108. The call placement service directory 108 returns the communication information to the recipient client device 102 in response to query. The communication information includes data identifying the communication provider 110 that manages the device identifier. For example, the data identifying the communication provider may include a link or other identifier (e.g., URI) that identifies the communication provider 110.

In some embodiments, querying the call placement service directory 108 may be restricted to recipient client devices 102 that have been authenticated by the verification service. For example, the verification service may utilize a public/private key pair to restrict querying of the call placement service directory 108. In this type of embodiment, a recipient client device 102 provides a public key to the verification service during an initial authentication process. The public key pairs to a private key maintained by the recipient client device 102. The public key is stored at the call placement service directory 108 and used to ensure that a query is received by an authorized client device 102, 104. This prevents unwanted queries to the call placement service directory 108.

During the verification process, the digital signature module 206 uses the private key stored by recipient client device 102 to digitally sign each query prior to the query being to the call placement service directory 108 by the call placement service directory querying module 204. In turn, the call placement service directory 108 uses the corresponding public key to determine whether to authorize the request. For example, the call placement service directory 108 will not return the requested communication information if the query cannot be verified using the public key stored by the call placement service directory 108.

The communication provider querying module 208 uses the communication information returned by the call placement service directory 108 to query the communication provider 110 identified by the communication information regarding whether the client device 104 identified by the device identifier transmitted the incoming communication received by the recipient client device 102. For example, the communication provider querying module 208 may use a link or identifier included in the returned communication information to query the communication provider 110. The query transmitted by the communication provider querying module 208 to the communication provider 110 may include the device identifier received by the recipient client device 102 along with the incoming communication.

In embodiments in which the incoming communication received by the recipient client device 102 is a phone call, the communication provider 110 confirms whether the client device 104 associated with the device identifier is engaged in an active communication session. The client device 104 associated with the device identifier being engaged in an active communication session suggests that the incoming communication did originate from the client device 104 associated with the device identifier. Conversely, the client device 104 associated with the device identifier not being engaged in an active communication session suggests that the incoming communication did not originate from the client device 104 associated with the device identifier.

As another example, if the incoming communication received by the recipient client device 102 is a message (e.g., text message, direct message, etc.), the communication provider 110 confirms whether the client device 104 associated with the device identifier transmitted the message to the recipient client device 102. For example, the communication provider confirms 110 whether a message including the payload of the incoming communication was sent by the client device 104 associated with the device identifier and/or that the client device 104 associated with the device identifier sent a message at a time corresponding to the timestamp of the incoming communication.

In some embodiments, a hashing algorithm is used to verify incoming messages. Using a hashing algorithm may reduce resource usage associated with the process of verifying incoming messages. The hashing module 210 generates a hash based on specified input, which is used to verify the incoming message. For example, the hashing module 220 may use one or more of the identifier received with the incoming communication, the identifier for the recipient device 102, a timestamp associated with the incoming message, and/or any portion of the message payload as input into the hashing algorithm.

The hashing module 220 provides the resulting output of the hashing algorithm to the communication provider querying module 208. The communication provider querying module 208 transmits the output to the communication provider 110 along with the query. In turn, the communication provider 110 uses similar data maintained by the communication provider 110 as input into the same hashing algorithm and compares the output to the output generated by the hashing module 220. For example, the communication provider 110 may use the identifier received with the incoming communication, the identifier for the most recent recipient device 102 to which the client device 104 identified by the identifier transmitted a message, a timestamp associated with the sent message, and/or any portion of the message payload as input into the hashing algorithm. Matching outputs indicate that the client device 104 associated with the device identifier transmitted the message to the recipient client device 102. Alternatively, outputs that do not match indicate that the client device 104 associated with the device identifier did not transmit the message to the recipient client device 102.

The verification module 212 determines whether to verify the incoming communication based on the query transmitted by the communication provider querying module 208. For example, the verification module 212 receives the response to the query from the communication provider querying module 208 and verifies the incoming communication when the response indicates that the client device 104 identified by the device identifier did transmit the incoming communication. Alternatively, the verification module 212 determines that the incoming verification is not verified if the response indicates that the client device 104 identified by the device identifier did not transmit the incoming communication or if a response is not received from the communication provider 110.

In the event that the verification module 212 determines that an incoming communication is verified, the verification module 212 causes the incoming communication to be presented on a display of the recipient client device 102. This may include causing presentation of an alert that an incoming call is being received and allowing for the incoming call to be accepted. As another example, causing presentation of the incoming communication may include presenting the incoming message on the display of the recipient client device 102. In some embodiments, the verification module 212 may also cause presentation of a visual indicator that the incoming communication (e.g., call, message) has been verified. For example, the visual indicator may be an icon, image or message indicating that the incoming communication is verified.

The presentation module 216 causes presentation of incoming communications and other content on the display of the recipient client device 102. Accordingly, the verification module 212 notifies the presentation module 216 that the incoming communication is verified. In response, the presentation module 216 causes presentation of the incoming communication, which may include presentation of the visual indicator as well.

In the event that the verification module 212 determines that an incoming communication is not verified, the verification module 212 may block the incoming communication. That is, the verification module 212 may prevent the incoming communication from being presented on the display of the recipient client device 102. For example, the verification module 212 may notify the presentation module 216 that the incoming communication is not verified. As a result, the presentation module 216 does not present the incoming communication on the display of the recipient client device 102.

In some embodiments, an incoming communication that has not been verified is presented, however a visual indicator indicating that the incoming communication has been verified is not presented. For example, the verification module 212 notifies the presentation module 216 that the incoming communication is not verified and, in turn, the presentation module 216 causes presentation of the incoming communication, but without the visual indicator indicating that the incoming communication has been verified. Further, in some embodiments, the presentation module 216 may cause presentation of a different visual indicator indicating that the incoming communication could not be verified or is not verified.

In addition to verifying the authenticity of an incoming communication, the verification service also allows for presentation of customized content on the recipient client device 102 along with an incoming communication. For example, the verification service allows a company or other entity to cause customized content, such as an image (e.g., logo, advertisement, picture, etc.) and/or a message, to be presented on a display of the recipient client device 102, when the company or entity initiates a communication with the recipient client device 102 (e.g., a representative of the company calls or messages the recipient client device 102).

To cause presentation of customized content along with an incoming communication, the verification software 116 retrieves the content (e.g., image, message, etc.) and/or a link to access the content during the verification process of an incoming communication. The content and/or link is initially provided by the entity (e.g. company) to the verification service, for example, during a registration process or when an incoming communication is initiated by the entity. For example, the entity may use an application to programmatically initiate the incoming communication, and the application may enable the entity to enter content, such as a message, when doing so.

The content and/or link may be stored by the call placement service directory 108 and/or the communication provider 110 and associated with the entity. For example, the content and/or link may be associated with one or more device identifiers allocated with the entity.

During the verification process, the content and/or link may be returned to the recipient client device 102 when either the call placement service directory 108 and/or the communication provider 110 are queried. The presentation module 216 presents the content along with an incoming communication. This allows entities to include a message regarding the reason for the incoming call. For example, a school may include a message indicating that an incoming call is regarding a sick child.

The content accessing module 214 accesses content to be displayed by the presentation module 216. For example, the content accessing module 214 uses the provided link returned to the recipient client device 102 to access the content from a web-based server. The content accessing module 214 provides the retrieved content to the presentation module 216, which may then present the retrieved content along with the incoming communication.

Figure 3:
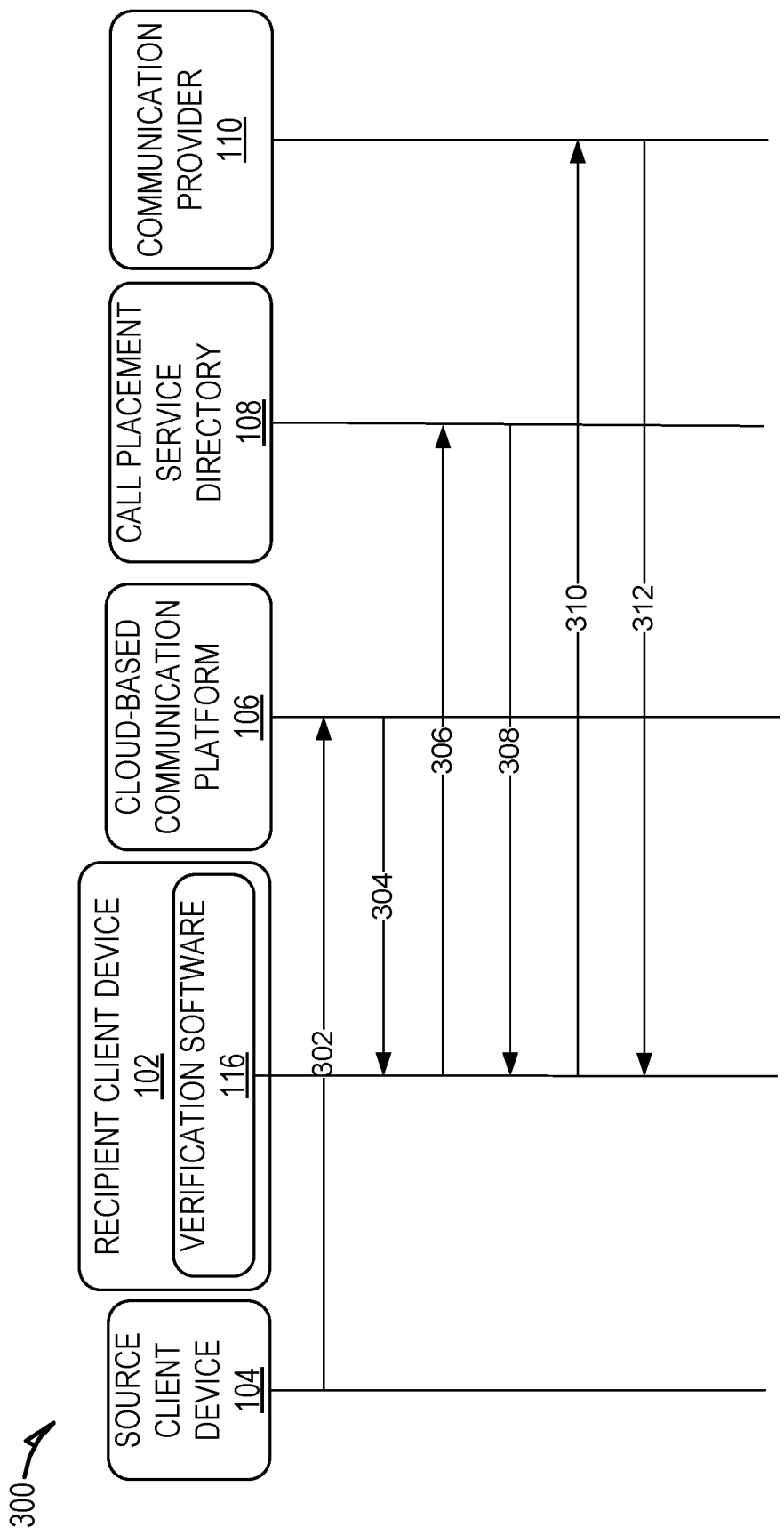
FIG. 3 shows a system for verifying incoming communications, according to some example embodiments.

FIG. 3 shows a system 300 for verifying incoming communications, according to some example embodiments. As shown, the system 300 includes a source client device 104, a recipient client device 102, a cloud-based communication platform 106, a call placement service directory 108 and a communication manager 110. To initiate a communication session with the recipient client device 102, the source client device 104 transmits a communication request 302 to the cloud-based communication platform 106. In this embodiment, the cloud-based communication platform 106 manages and facilitates communications for the recipient client device 102, such as by managing a device identifier (e.g., phone number) allocated to the recipient client device 102. The communication request 302 identifies the recipient client device 102 (e.g., through use of the device identifier allocated to the recipient client device 102) and includes a device identifier meant to identify the source client device 104. Inclusion of the identifier identifying the source client device 103 is to identify the source client device 104 to the recipient client device 102.

In response to receiving the communication request 302, the cloud-based communication platform 106 forwards an incoming communication 304 to the recipient client device 102. The incoming communication 304 includes the device identifier received from the source client device 104 as part of the communication request 202 that is meant to identify the source client device 104.

The recipient client device 102 includes verification software 116 that provides the verification service facilitated by the cloud-based communication platform 106. That is, the recipient client device 102 includes verification software 116 provided by the cloud-based communication platform 106 that causes the recipient client device 102 to perform a verification process in response to receiving the incoming communication 304. The verification process verifies that the device identifier received from the source client device 104 properly identifies the source client device 104. In other words, the verification process ensures that the device identifier received from the source client device 104 is not a spoofed device identifier.

In response to receiving the incoming communication, the verification software 116 executing on the recipient client device 102 causes the recipient client device 102 to transmit a query 306 to the call placement service directory 108. The query 306 includes the device identifier received from the source client device 104 as part of the communication request 302.

The call placement service directory 108 maintains a list of device identifiers and corresponding communication information. The communication information corresponding to each device identifier includes data identifying the communication provider 110 managing the device identifier. The communication information may also include content associated with an entity associated with the device identifier. For example, the content may include links to images, video, audio, etc., as well as a message, such as a text-based message.

In response to receiving the query 306, the call placement service directory 108 executes a search based on the device identifier received in the query 306. If the search executed by call placement service directory 108 successfully identifies the device identifier received in the query 306, the call placement service directory 108 accesses the corresponding communication information and returns the communication information to the recipient client device 102 in a response 308 to the query 306. Alternatively, if the search executed by call placement service directory 108 does not successfully identify the device identifier received in the query 306, the call placement service directory 108 may not transmit a response 308 to the query 306 or transmit data in the response 308 to the query 306 that indicates that the device identifier received in the query 306 was not found.

In response to receiving a response 308 that includes the communication information corresponding to the device identifier the verification software 116 causes the recipient client device 102 to transmits a verification request 310 to the communication provider 110 identified in the communication information. The verification request 310 includes the device identifier received from the source client device 104 and requests that the communication provider 110 confirm whether the client device that has been allocated the device identifier transmitted the incoming communication 304, indicating that the device identifier corresponds to the source client device 104 and is not spoofed.

The communication provider 110 transmits a verification response 312 to the recipient client 104 indicating whether the client device allocated to the device identifier transmitted the incoming communication 304. For example, the communication provider 110 determines whether the client device allocated to the device identifier is engaged in an active communication session or transmitted a message to the recipient client device 102 with a matching payload. If the verification response 312 indicates that the client device allocated to the device identifier did transmit the incoming communication 304 (e.g., is actively engaged in a communication session), the verification software 116 executing on the recipient client device 102 deems the incoming communication 304 to be verified (e.g., the device identifier received in the communication request 302 identifies the source client device 104). Alternatively, if the verification response 312 indicates that the client device allocated to the device identifier is not actively engaged in a communication session, the verification software 116 executing on the recipient client device 102 deems the incoming communication 304 to be unverified (e.g., the device identifier received in the communication request 302 does not identify the source client device 104).

In some embodiments, the verification software 116 causes the recipient client device 102 to block the incoming communication 304 when the incoming communication 304 is deemed unverified. That is, the recipient client device 102 will not present the incoming communication on a display of the recipient client device 102, indicate that the incoming communication has been received, or allow a user of the recipient client device 102 to engage in a communication session based on the incoming communication 404. For example, the verification software 116 may cause the recipient client device 102 to not ring, vibrate, or otherwise alert a user of the recipient client device 102 that an incoming call has been received. Alternatively, the verification software 116 may allow presentation of the incoming communication but cause the recipient client device 102 to present a notification indicating that the incoming communication is unverified, using a spoofed client identifier, and/or otherwise likely to be a scam.

Alternatively, if the verification software 116 determines that the incoming communication 304 is verified, the verification software 116 instructs the recipient client device 102 to accept the incoming communication 304. This allows a user of the recipient client device 102 to answer and/or respond to the incoming communication 104. In some embodiments, the verification software 116 may cause the recipient client device 102 to present data indicating that the incoming communication 304 has been verified. For example, the user may be presented with a message, icon or other image indicating the incoming communication 304 has been verified.

In some embodiments, the verification software 116 may cause presentation of the content included in the communication information returned by the call placement service directory 108 in the response 308 to the query 306. As explained, the communication information may include a message or links to images, video, etc., that are provided by an entity associated with the source client device 104. The verification software 116 may cause the recipient client device 102 to present the message and/or content on a display of the source client device 102 along with an indication that the incoming communication is being received. For example, the verification software 116 may cause the recipient client device 102 to use the links included in the communication information to access the corresponding images, video, etc., which are the presented on the display of the recipient client device 102.

Figure 4:
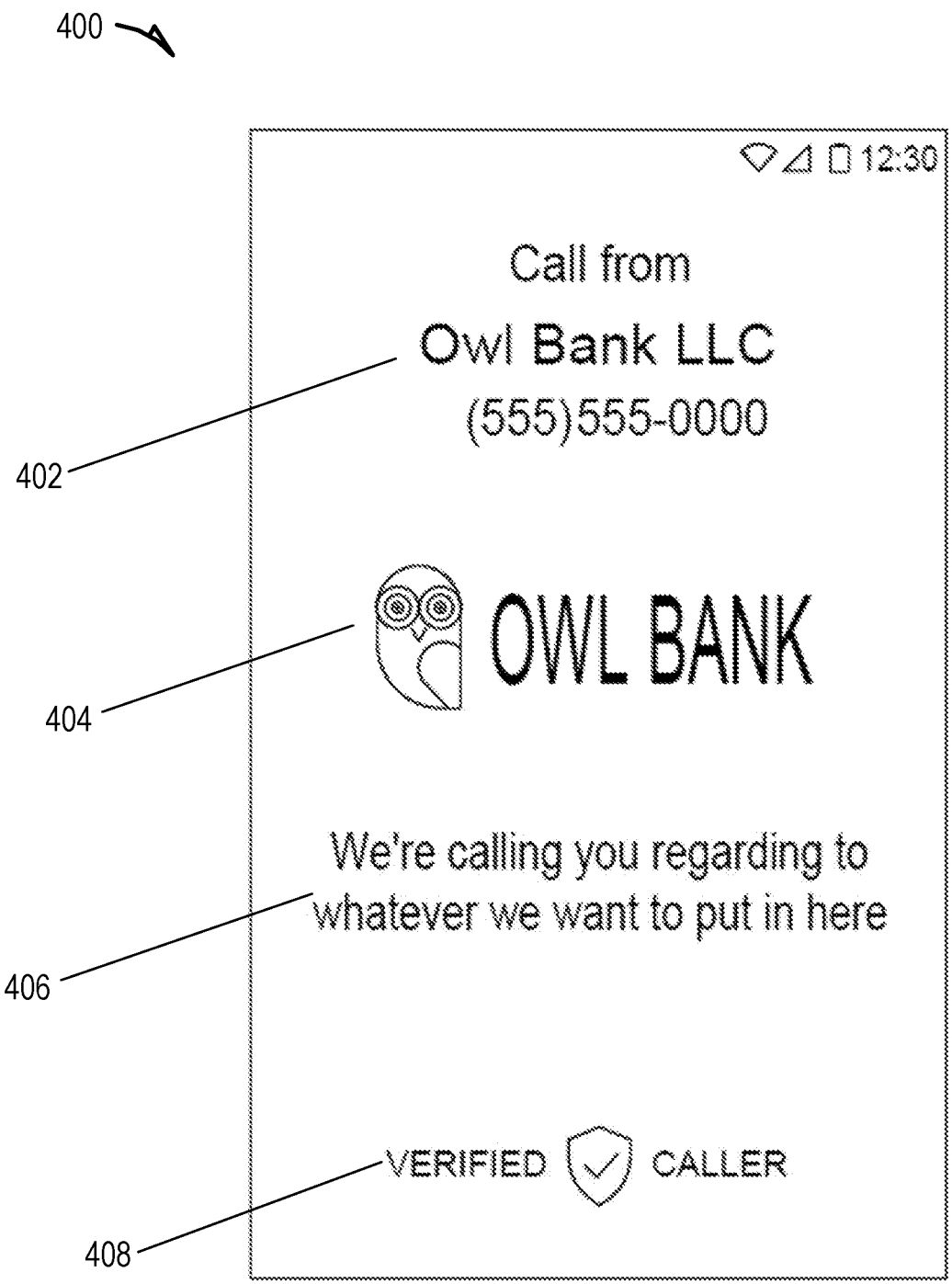
FIG. 4 shows a screenshot of a presentation of a verified incoming communication, according to some example embodiments.

FIG. 4 shows a screenshot of a presentation 400 of a verified incoming communication 400, according to some example embodiments. As shown, the presentation 400 includes content provided by the entity that transmitted the incoming communication. For example, the presentation includes data identifying the source 402 of the incoming communication. Specifically, the data identifying the source 402 includes the name of the entity associated with the incoming communication (e.g., Owl Bank) as well as the device identifier associated with the incoming communication (e.g., 555-555-1000). The presentation 400 further includes a logo 404 for the entity as well as a message 406 provided by the entity. The message 406 indicates the purpose of the incoming communication. For example, the message 406 may indicate that a doctor is attempting to confirm an appointment. As another example, the message 406 may indicate that the incoming communication is an emergency. The presentation 400 further includes an indication 408 that the incoming communication has been verified. That is, the indication 408 indicates that the device identifier associated with the incoming communication has been verified as corresponding to the source client device 104 from which the incoming communication was received.

Figure 5:
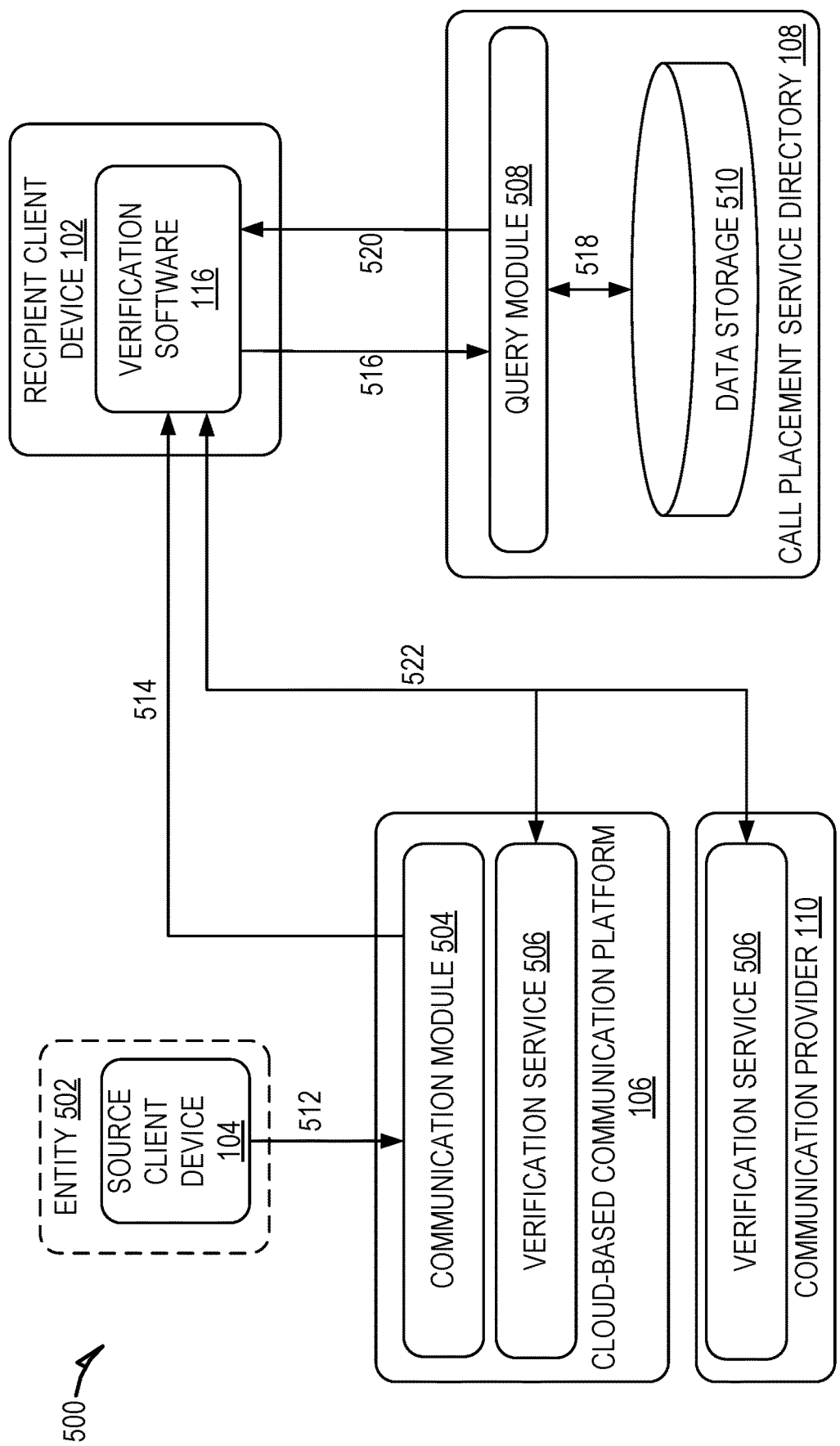
FIG. 5 shows communications within a system for verifying an incoming communication, according to some example embodiments.

FIG. 5 shows communications within a system 500 for verifying an incoming communication, according to some example embodiments. An entity 502 may initiate a communication to a recipient client device 102. For example, the entity 502 may use a source client device 104 to transmit a communication 502 to the cloud-based communication platform 106, which facilitates communications for the entity. That is, the entity 502 may be a customer of the cloud-based communication platform 106 and the source client device 104 may be associated with a device identifier allocated to the source client device 104 by the entity 502. The communication 502 may be initiated by the entity providing a device identifier for the recipient client device 102 to which the entity would like to communicate. For example, the device identifier may be provided using a keypad of the source client device 104, such as when initiating a phone call or generating a text message.

Alternatively, the communication 502 may be initiated using programmatically using an application executing on the source client device 104. For example, the application may allow for a group of one or more device identifiers to be entered to initiate communications with client devices corresponding to each device identifier. In this type of embodiment, the entity 502 may provide content when initiating the communication 512, such as by entering a message or providing an image to be presented to the recipient client device 102.

The communication 512 is received by the communication module 504 of the cloud-based communication platform 106. The communication module 504 facilitates communications for clients of the cloud-based communication platform 106. For example, the communication module 504 forwards communications to their intended destination and/or establishes communication sessions between client devices. In some embodiments, the communication module 504 stores the content received from the source client device 104 as part of the communication.

The communication module 504 transmits an incoming communication 514 to the recipient client device 102. The incoming communication 514 includes the device identifier received by the communication module 504 along with the communication 512. In some embodiments, the incoming communication may further include the content received from the source client device 104 as part of the communication.

The incoming communication 514 is received by the verification software 116 installed on the recipient client device 102. The verification software 116 initiates a verification process to determine whether the device identifier properly identifies the source client device 104, or if the device identifier has been spoofed.

To verify the device identifier, the verification software 116 queries 516 a call placement service directory 108. The call placement service directory 108 maintains a listing of device identifiers and corresponding communication providers 110 that maintain the device identifiers. The query 516 includes the device identifier received in the incoming communication 514.

The query 516 is received by a query module 508 of the call placement service directory 108. The query module 508 manages intake and processing of queries. For example, the query module 508 uses the device identifier included in the query 516 to execute a search query 518 of the data storage 510. That is, the query module 508 executes a search query 518 for the device identifier in the listing maintained by the data storage 510. If the search query 518 results in a match, the query module 508 retrieves the communication information corresponding to the device identifier. The communication information includes data identifying the communication provider 110 that manages the device identifier. The communication information may also include content provided by the entity, such as a message, image, link to content, etc.

The query module 508 transmits a response 520 to the client recipient client device 102 based on the search query 518. For example, the response 520 may include the communication information returned as a result of the search query 518. Alternatively, the response 520 may indicate that the device identifier was not found.

The verification software 116 uses communication received from the call placement service directory 108 to then query 522 the communication provider 110 identified by the communication information. The query 522 includes the device identifier and requests that the communication provider confirm that the source client device 104 associated with the device identifier transmitted the incoming communication 514.

FIG. 5 shows the query 522 being directed to the cloud-based communication platform 106 and the communication provider 110. This is to illustrate that the system 500 may include any number of communication providers 110 and that the cloud-based communication platform 106 may be the communication provider that manages the device identifier. The communication information returned in response to a query 516 of the call placement service directory 108 will identify only a single communication provider 110. Accordingly, the verification software 116 will transmit the query 522 to the single communication provider 110 identifier for each incoming communication.

The query 522 is received by a verification service 506 of the communication provider 110. The verification service 110 uses the received device identifier to confirm whether the incoming communication was transmitted by the source client device 104 associated with the device identifier.

In embodiments in which the incoming communication 514 is a phone call, the verification service 506 confirms whether the source client device 104 associated with the device identifier is engaged in an active communication session. The source client device 104 being engaged in an active communication session suggests that the incoming communication did originate from the source client device 104 associated with the device identifier. Conversely, the source client device 104 not being engaged in an active communication session suggests that the incoming communication did not originate from the client device 104 associated with the device identifier.

As another example, if the incoming communication 514 is a message (e.g., text message, direct message, etc.), the verification service 506 confirms whether the client device 104 associated with the device identifier transmitted the message to the recipient client device 102. For example, the verification service 506 determines whether a message including the payload of the incoming communication 514 was sent by the source client device 104 associated with the device identifier and/or that the source client device 104 associated with the device identifier sent a message at a time corresponding to the timestamp of the incoming communication.

The verification service 506 returns a response 522 to the recipient client device 102 indicating whether the source client device 104 transmitted the incoming communication 514. The response 522 may also include content provided by the entity 502. For example, the response 522 may include content included in the communication 512 form the source client device 104. Further, the content may include content that was previously provided to the communication provider 110 by the entity 502.

The verification software 116 processes the incoming communication 514 based on the response 522. To process the incoming communication, the verification software 116 determines whether to verify the incoming communication based on the response 522. For example, the verification software verifies the incoming communication 514 when the response 522 indicates that the source client device 104 identified by the device identifier did transmit the incoming communication. Alternatively, the verification software 116 determines that the incoming verification 514 is not verified if the response 522 indicates that the source client device 104 identified by the device identifier did not transmit the incoming communication 514 or if a response 522 is not received from the communication provider 110.

In the event that the verification software 116 determines that an incoming communication is verified, the verification software 116 causes the incoming communication 514 to be presented on a display of the recipient client device 102. This may include causing presentation of an alert that an incoming call is being received and allowing for the incoming call to be accepted. As another example, causing presentation of the incoming communication 514 may include presenting the incoming message on the display of the recipient client device 102. In some embodiments, the verification software 116 may also cause presentation of a visual indicator that the incoming communication 514 (e.g., call, message) has been verified. For example, the visual indicator may be an icon, image or message indicating that the incoming communication is verified.

The verification software 116 may also present content provided by the entity 502, such as content received as part of the incoming communication or in response to the queries 516, 522 of the call placement service directory 108 and/or the communication provider 110.

In the event that the verification software 116 determines that the incoming communication 514 is not verified, the verification software 116 may block the incoming communication 514. That is, the verification software 116 may prevent the incoming communication 514 from being presented on the display of the recipient client device 102. Alternatively, in some embodiments, the verification software 116 can present an incoming communication 514 that has not been verified, however does not present a visual indicator indicating that the incoming communication 514 has been verified. Further, the verification software 116 may present a different visual indicator indicating that the incoming communication 514 could not be verified or is not verified.

Figure 6:
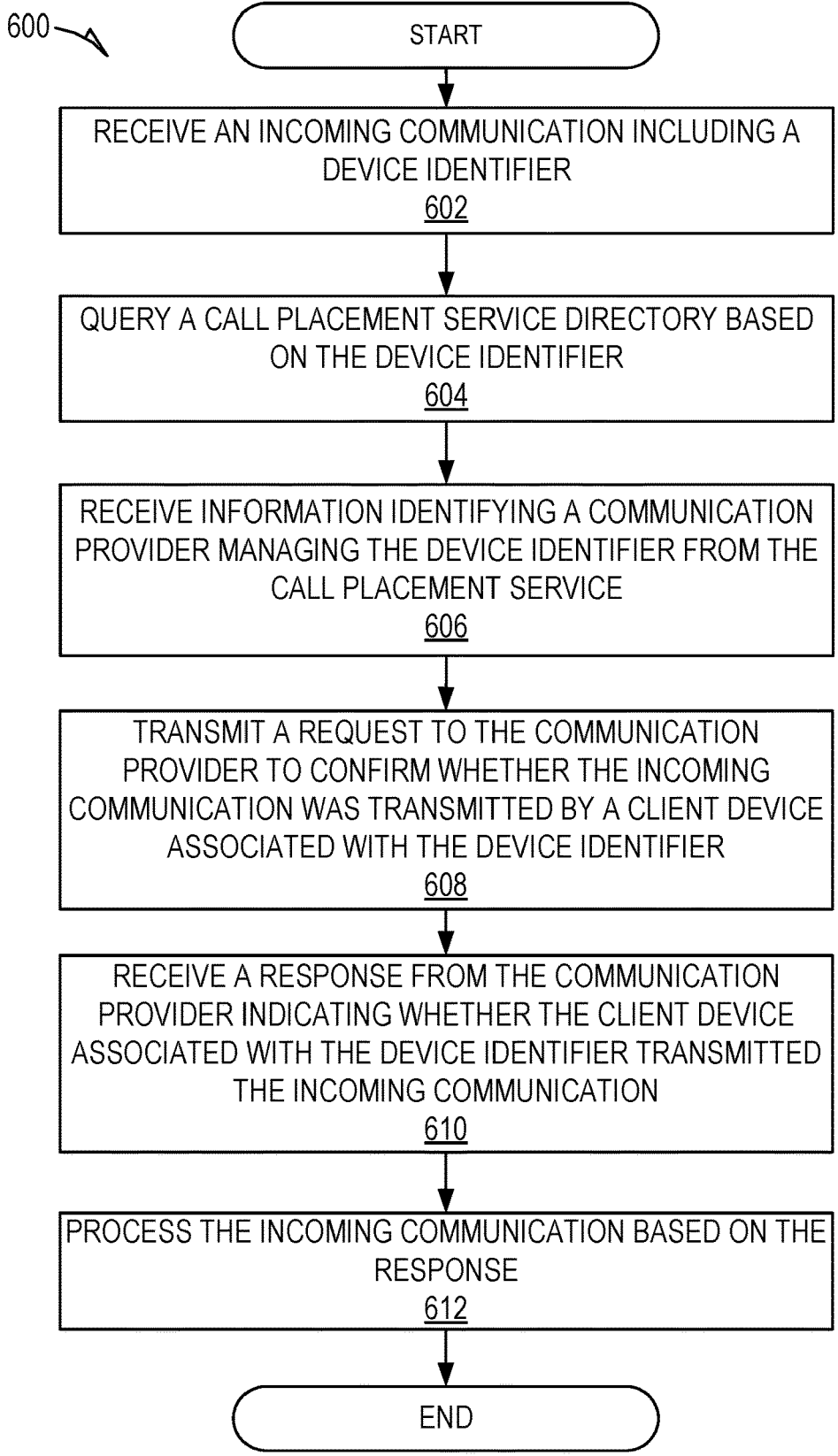
FIG. 6 is a flowchart showing an example method of verifying an incoming communication, according to some example embodiments.

FIG. 6 is a flowchart showing an example method 600 of verifying an incoming communication, according to some example embodiments. The method 600 may be embodied in computer readable instructions for execution by one or more processors such that the operations of the method 600 may be performed in part or in whole by the verification software 116; accordingly, the method 600 is described below by way of example with reference thereto. However, it shall be appreciated that at least some of the operations of the method 600 may be deployed on various other hardware configurations and the method 600 is not intended to be limited to the verification software 116.

At operation 602, the incoming communication detection module 202 receives an incoming communication including a device identifier. An incoming communication may be an incoming call, message, video call, etc. The incoming communication may include a device identifier that identifies the client device 104 that transmitted the incoming communication.

In response to detecting an incoming communication, the incoming communication detection module 202 initiates a verification process to verify the device identifier received with the incoming communication. For example, the verification process verifies that the client device 104 identified by the device identifier transmitted the incoming communication (e.g., the device identifier was not spoofed). To initiate the verification process, the incoming communication detection module 202 provides the device identifier to the call placement service directory querying module 204.

At operation 604, the call placement service directory querying module 204 queries a call placement service directory 108 based on the device identifier. The call placement service directory 108 stores a listing of device identifiers (e.g., phone numbers) and associated communication information. The communication information associated with each listed device identifier includes data identifying the communication provider 110 (e.g., the cloud-based communication platform, third-party communication platform, etc.) that manages the corresponding device identifier.

The query transmitted by the call placement service directory querying module 204 requests that the call placement service directory 108 return the communication information associated with the device identifier received along with an incoming communication. For example, the call placement service directory querying module 204 may include the device identifier in the query transmitted to the call placement service directory 108.

The call placement service directory 108 returns the communication information to the recipient client device 102 in response to query. Accordingly, at operation 606, the call placement service directory querying module 204 receives information identifying a communication provider managing the device identifier from the call placement service. The communication information includes data identifying the communication provider 110 that manages the device identifier. For example, the data identifying the communication provider may include a link or other identifier (e.g., URI) that identifies the communication provider 110.

At operation 608, the communication provider querying module 208 transmits a request to the communication provider 110 to confirm whether the incoming communication was transmitted by a client device 104 associated with the device identifier. For example, the communication provider querying module 208 may use a link or identifier included in the returned communication information to query the communication provider 110. The query transmitted by the communication provider querying module 208 to the communication provider 110 may include the device identifier received by the recipient client device 102 along with the incoming communication.

In embodiments in which the incoming communication received by the recipient client device 102 is a phone call, the communication provider 110 confirms whether the client device 104 associated with the device identifier is engaged in an active communication session. The client device 104 associated with the device identifier being engaged in an active communication session suggests that the incoming communication did originate from the client device 104 associated with the device identifier. Conversely, the client device 104 associated with the device identifier not being engaged in an active communication session suggests that the incoming communication did not originate from the client device 104 associated with the device identifier.

As another example, if the incoming communication received by the recipient client device 102 is a message (e.g., text message, direct message, etc.), the communication provider 110 confirms whether the client device 104 associated with the device identifier transmitted the message to the recipient client device 102. For example, the communication provider confirms 110 whether a message including the payload of the incoming communication was sent by the client device 104 associated with the device identifier and/or that the client device 104 associated with the device identifier sent a message at a time corresponding to the timestamp of the incoming communication.

In some embodiments, a hashing algorithm is used to verify incoming messages. Using a hashing algorithm may reduce resource usage associated with the process of verifying incoming messages. The hashing module 210 generates a hash based on specified input, which is used to verify the incoming message. For example, the hashing module 220 may use one or more of the identifier received with the incoming communication, the identifier for the recipient device 102, a timestamp associated with the incoming message, and/or any portion of the message payload as input into the hashing algorithm.

The hashing module 220 provides the resulting output of the hashing algorithm to the communication provider querying module 208. The communication provider querying module 208 transmits the output to the communication provider 110 along with the query. In turn, the communication provider 110 uses similar data maintained by the communication provider 110 as input into the same hashing algorithm and compares the output to the output generated by the hashing module 220. For example, the communication provider 110 may use the identifier received with the incoming communication, the identifier for the most recent recipient device 102 to which the client device 104 identified by the identifier transmitted a message, a timestamp associated with the sent message, and/or any portion of the message payload as input into the hashing algorithm. Matching outputs indicate that the client device 104 associated with the device identifier transmitted the message to the recipient client device 102. Alternatively, outputs that do not match indicate that the client device 104 associated with the device identifier did not transmit the message to the recipient client device 102.

At operation 610, the verification software 116 processes the incoming communication based on the response. To process the incoming communication, the verification module 212 determines whether to verify the incoming communication based on the query transmitted by the communication provider querying module 208. For example, the verification module 212 receives the response to the query from the communication provider querying module 208 and verifies the incoming communication when the response indicates that the client device 104 identified by the device identifier did transmit the incoming communication. Alternatively, the verification module 212 determines that the incoming verification is not verified if the response indicates that the client device 104 identified by the device identifier did not transmit the incoming communication or if a response is not received from the communication provider 110.

In the event that the verification module 212 determines that an incoming communication is verified, the verification module 212 causes the incoming communication to be presented on a display of the recipient client device 102. This may include causing presentation of an alert that an incoming call is being received and allowing for the incoming call to be accepted. As another example, causing presentation of the incoming communication may include presenting the incoming message on the display of the recipient client device 102. In some embodiments, the verification module 212 may also cause presentation of a visual indicator that the incoming communication (e.g., call, message) has been verified. For example, the visual indicator may be an icon, image or message indicating that the incoming communication is verified.

The presentation module 216 causes presentation of incoming communications and other content on the display of the recipient client device 102. Accordingly, the verification module 212 notifies the presentation module 216 that the incoming communication is verified. In response, the presentation module 216 causes presentation of the incoming communication, which may include presentation of the visual indicator as well.

In the event that the verification module 212 determines that an incoming communication is not verified, the verification module 212 may block the incoming communication. That is, the verification module 212 may prevent the incoming communication from being presented on the display of the recipient client device 102. For example, the verification module 212 may notify the presentation module 216 that the incoming communication is not verified. As a result, the presentation module 216 does not present the incoming communication on the display of the recipient client device 102.

In some embodiments, an incoming communication that has not been verified is presented, however a visual indicator indicating that the incoming communication has been verified is not presented. For example, the verification module 212 notifies the presentation module 216 that the incoming communication is not verified and, in turn, the presentation module 216 causes presentation of the incoming communication, but without the visual indicator indicating that the incoming communication has been verified. Further, in some embodiments, the presentation module 216 may cause presentation of a different visual indicator indicating that the incoming communication could not be verified or is not verified.

Software Architecture

Figure 7:
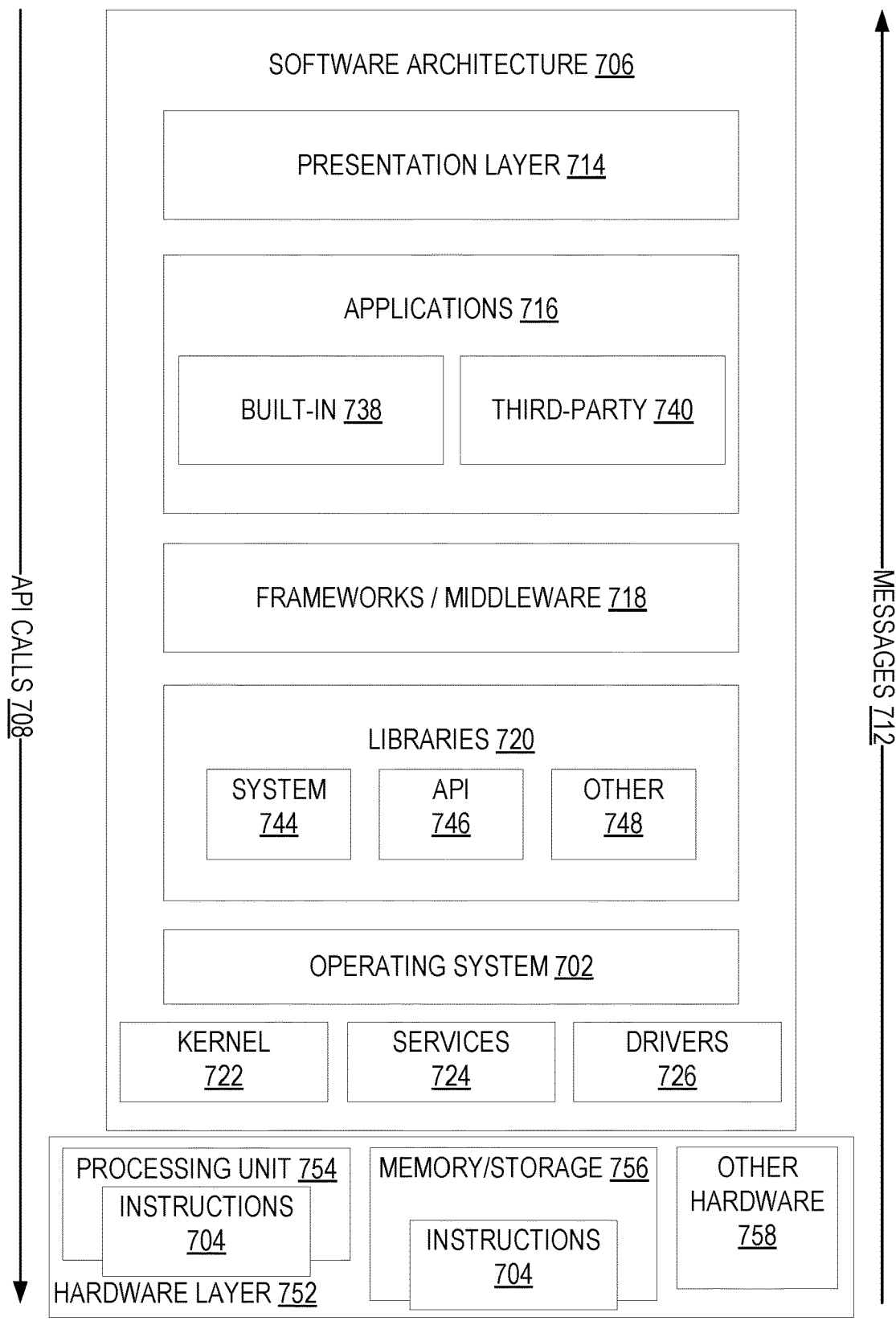
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 752 is illustrated and can represent, for example, the machine 800 of FIG. 8. The representative hardware layer 752 includes a processing unit 754 having associated executable instructions 704. Executable instructions 704 represent the executable instructions of the software architecture 706, including implementation of the methods, components, and so forth described herein. The hardware layer 752 also includes memory and/or storage modules 756, which also have executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. Third-party applications 740 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
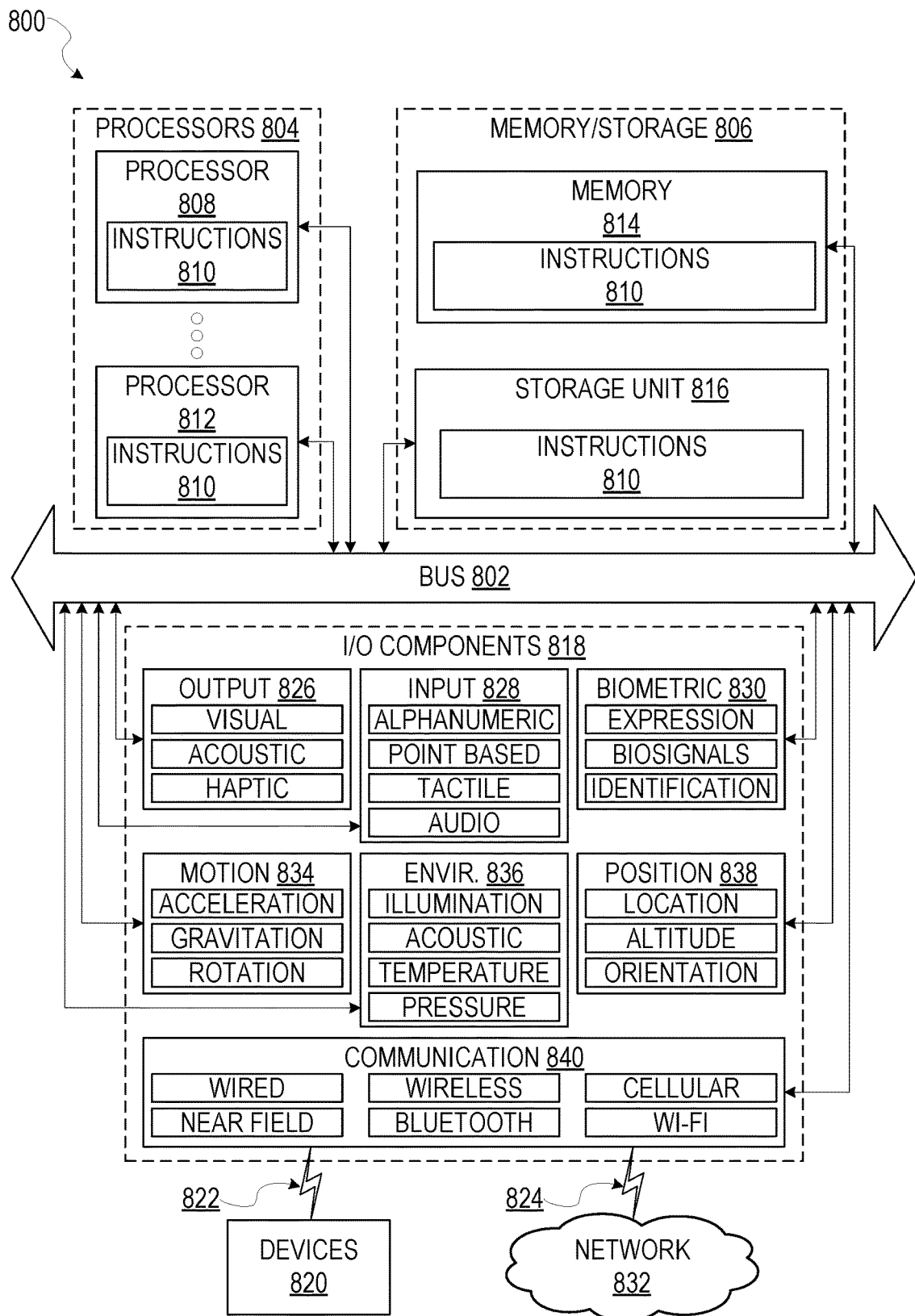
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices 102, 104. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810.

The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:

1. A method comprising:
receiving, by a first client device, an incoming communication, the incoming communication including a first identifier identifying a second client device as having initiated the incoming communication;
querying a call placement service directory based on the first identifier, the call placement service directory maintaining a listing of identifiers for client devices and corresponding communication providers that manage the identifiers;
receiving, from the call placement service directory, information identifying a first communication provider as managing the first identifier;
transmitting, to the first communication provider identified in the information received from the call placement service directory, a request to confirm whether the second client device identified by the first identifier initiated the incoming communication;
receiving, from the first communication provider, a response indicating whether the second client device identified by the first identifier initiated the incoming communication, the response including a message provided to the first communication provider by an entity that has been allocated a second identifier by the first communication provider;
processing the incoming communication based on the response, the processing comprising determining, based on the response, that the second client device initiated the incoming communication, yielding a verification that the second client device initiated the incoming communication and, based on the verification that the second client device initiated the incoming communication, presenting, on a display of the first client device, data indicating that the incoming communication has been received; and
presenting the message on the display of the first client device.

2. The method of claim 1, wherein the incoming communication requests to initiate a call between the second client device and the first client device.

3. The method of claim 2, wherein the first communication provider confirms whether the second client device initiated the incoming communication by determining whether the second client device is engaged in an active call.

4. The method of claim 1, wherein processing the incoming communication based on the response comprises:
determining, based on the response, that the second client device did not initiate the incoming communication, yielding a determination that the incoming communication includes a spoofed identifier; and
terminating the incoming communication based on the determination that the incoming communication includes a spoofed identifier.

5. The method of claim 1, further comprising:
presenting, on the display of the first client device, a visual indicator indicating that the incoming communication has been verified.

6. The method of claim 1, wherein the response includes data identifying an image, the method further comprising:
presenting the image on the display of the first client device.

7. The method of claim 6, wherein the image is a logo associated with an entity that has been allocated the second identifier by the first communication provider.

8. A recipient client device comprising:
one or more computer processors; and
one or more computer-readable mediums storing instructions that, when executed by the one or more computer processors, cause the recipient client device to perform operations comprising:
receiving an incoming communication directed to a first identifier allocated to the recipient client device, the incoming communication including a second identifier identifying a second client device as having initiated the incoming communication;
querying a call placement service directory based on the second identifier, the call placement service directory maintaining a listing of identifiers for client devices and corresponding communication providers that manage the identifiers;
receiving, from the call placement service directory, information identifying a first communication provider as managing the second identifier;
transmitting, to the first communication provider identified in the information received from the call placement service directory, a request to confirm whether the second client device identified by the second identifier initiated the incoming communication;
receiving, from the first communication provider, a response indicating whether the second client device identified by the second identifier initiated the incoming communication, the response including a message provided to the first communication provider by an entity that has been allocated a second identifier by the first communication provider; and
processing the incoming communication based on the response, the processing comprising determining, based on the response, that the second client device initiated the incoming communication, yielding a verification that the second client device initiated the incoming communication and, based on the verification that the second client device initiated the incoming communication, presenting, on a display of the first client device, data indicating that the incoming communication has been received; and
presenting the message on the display of the first client device.

9. The recipient client device of claim 8, wherein the incoming communication requests to initiate a call between the second client device and the recipient client device and the first communication provider confirms whether the second client device initiated the incoming communication by determining whether the second client device is engaged in an active call.

10. The recipient client device of claim 8, wherein processing the incoming communication based on the response comprises:
determining, based on the response, that the second client device did not initiate the incoming communication, yielding a determination that the incoming communication includes a spoofed identifier; and
terminating the incoming communication based on the determination that the incoming communication includes a spoofed identifier.

11. The recipient client device of claim 8, the operations further comprising:

presenting, on the display of the recipient client device, a visual indicator indicating that the incoming communication has been verified.

12. The recipient client device of claim 8, wherein the response includes data identifying an image, the operations further comprising:

presenting the image on the display of the recipient client device.

13. The recipient client device of claim 12, wherein the image is a logo associated with an entity that has been allocated the second identifier by the first communication provider.

14. A non-transitory computer-readable medium storing instructions that, when executed by one or more computer processors of a recipient client device, cause the recipient client device to perform operations comprising:

receiving an incoming communication directed to a first identifier allocated to the recipient client device, the incoming communication including a second identifier identifying a second client device as having initiated the incoming communication;

querying a call placement service directory based on the second identifier, the call placement service directory maintaining a listing of identifiers for client devices and corresponding communication providers that manage the identifiers;

receiving, from the call placement service directory, information identifying a first communication provider as managing the second identifier;

transmitting, to the first communication provider identified in the information received from the call placement service directory, a request to confirm whether the second client device identified by the second identifier initiated the incoming communication;

receiving, from the first communication provider, a response indicating whether the second client device identified by the second identifier initiated the incoming communication, the response including a message provided to the first communication provider by an entity that has been allocated a second identifier by the first communication provider; and processing the incoming communication based on the response, the processing comprising determining, based on the response, that the second client device initiated the incoming communication, yielding a verification that the second client device initiated the incoming communication and, based on the verification that the second client device initiated the incoming communication, presenting, on a display of the first client device, data indicating that the incoming communication has been received; and presenting the message on the display of the first client device.

* * * * *